United States Patent

[11] 3,572,805

[72] Inventor Edwin W. Murphy
 York, Pa.
[21] Appl. No. 855,112
[22] Filed Sept. 4, 1969
[45] Patented Mar. 30, 1971
[73] Assignee Allis-Chalmers Manufacturing Company
 Milwaukee, Wis.

[54] TRASH RAKE
 1 Claim, 2 Drawing Figs.
[52] U.S. Cl. ........................................... 294/88,
 294/104, 212/135, 212/84
[51] Int. Cl. .......................................... B66c 1/00
[50] Field of Search ............................... 294/49,
 50.9, 88, 104, 108, 109, 112, 120, 123, 127;
 212/81, 83, 84, 125, 127, 129, 135, 138

[56] References Cited
UNITED STATES PATENTS
40,709  11/1863  Raymond .................. 212/81
3,038,620  6/1962  Collin ........................ 294/88

Primary Examiner—Harvey C. Hornsby
Attorneys—John P. Hines, Robert B. Benson and Arthur M. Streich ABSTRACT: The trash rake employs a double-acting hydraulic cylinder positioned between the rake teeth and rake tines. The hydraulic cylinder may be activated to hold the rake in any number of positions between the fully opened and fully closed positions. The rake is positively held in any of the adjusted positions due to the pressurized hydraulic fluid in the cylinder.

PATENTED MAR 30 1971 3,572,805

Inventor
Edwin W. Murphy
By John C. Hines
Attorney

TRASH RAKE

This invention pertains in general to trash rakes and more particularly to a trash rake which is operated by a double-acting hydraulic cylinder.

In hydraulic installations, such as a hydraulic turbine, a screen is provided in the water passageway upstream from the operating parts of the turbine. The screen is positioned so that all water moving into the turbine must pass through it. The screen is designed so that large pieces of debris, such as logs, which might damage the hydraulic turbine, cannot pass through the screen. Over a period of time, the debris clogs the screen to the point of interfering with a sufficient flow of water. It is then necessary to provide means to clean this debris from the face of the screen.

It is the practice in many hydraulic installations to provide a trash rake to remove the debris from the screen. The rake travels up and down on the screen grating and is usually composed of a series of spaced tines and teeth which are pivoted together at one end thereof. As the rake is lowered along the screen, the teeth are open relative to the tines. When the debris is engaged by the tines, means are provided to close the teeth about the debris holding it between the teeth and the tines. The rake is then raised removing the debris from the screen.

Many different mechanisms have been provided to open and close the rake teeth. Most of these are mechanical devices which are operated by cables suspended from the hydraulic installation above the screen. It is desirable that this operating mechanism be capable of exerting sufficient force to ensure that the debris will be held in the rake when it is raised from the stream.

It is therefore the intention and general object of this invention to provide a trash rake for a hydraulic installation wherein positive hydraulic force is used to position the rake teeth relative to the rake tines.

A more specific object of the subject invention is to provide a trash rake for a hydraulic installation wherein a double-acting hydraulic cylinder is used to selectively position the rake teeth relative to the rake tines.

These and other objects of the subject invention will become more fully apparent as the following description is read in light of the attached drawings wherein.

Figure 1:
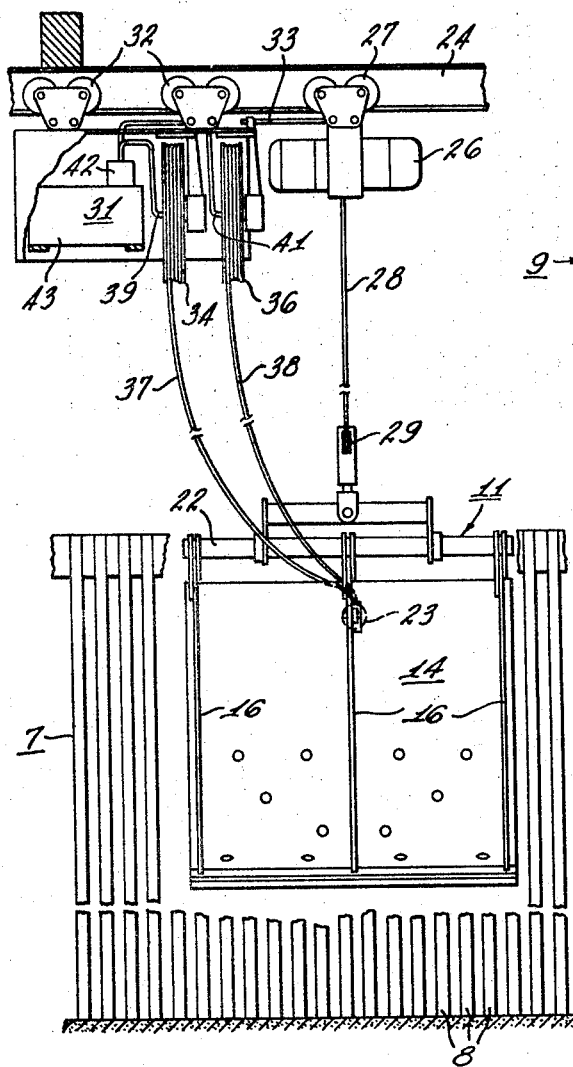
FIG. 1 shows a trash rake constructed in accordance with the invention.

Referring to the attached drawing, the water passageway into the hydraulic turbine (not shown) is generally designated 6. A screen having a plurality of laterally spaced parallel grates 8 is provided across the passageway 6. The screen 7 is supported by a portion of the hydraulic installation superstructure generally designated 9.

The trash rake generally designated 11 is composed of a rake tooth 12 and a rake tine 13. As shown herein for purposes of illustration, the rake tooth 12 is constructed of a solid steel plate 14 reinforced by spaced ribs 16. The tooth 12 curves at the bottom to engage the tine 13 forming a trash retaining space therebetween. Reinforcing straps 17 may be provided to further strengthen the lower portion of the tooth. The tine 13 may also be constructed of a solid plate having laterally spaced parallel reinforcing ribs 18. It should be understood that both the tooth 12 and the tine 13 may be constructed with individual closely spaced parallel ribs rather than providing a steel plate as is herein shown for purposes of illustration.

The uppermost portions of each of the ribs 16 and 18 are provided with hinge members 19 and 21 respectively. These hinge members have aligned bores therethrough which are pivotally supported on a rod 22. A double-acting hydraulic cylinder 23 is operatively positioned between the rake tooth 12 and rake tine 13. As herein shown for purposes of illustration, the cylinder 23 is pivotally connected to the rake tine 13, and the piston rod of the cylinder 23 is pivotally connected to the rake tooth 12. It should be understood that the connection of the hydraulic cylinder to the rake could be reversed from that shown herein.

An I-beam 24 is rigidly connected to the columns 25 of the superstructure 9 of the hydraulic installation. This I-beam is positioned above and is disposed parallel to the screen 7. A conventional electric hoist 26 is connected to the I-beam by rollers 27. The hoist cable 28 is connected to a cable pulley 29 which in turn is pivotally connected to the rod 22.

A hydraulic power package generally designated 31 for the cylinder 23 is connected to the I-beam 24 by means of rollers 32. The power package 31 is connected to the electric hoist 26 by means of a connecting bar 33 to permit travel of the power package along the I-beam with the hoist. A pair of spring-biased hose reels 34 and 36 are rotatably supported by the hydraulic power package 31 and support hydraulic hoses 37 and 38 which are connected at one end to the double-acting hydraulic cylinder 23. The hose reels 34 and 36 are of the conventional type which are spring biased to automatically retract the hoses as slack is provided therein due to raising the rake 11. The weight of the rake pulling on the hoses as it is lowered overcomes the bias of the spring in the reels to permit the hoses to unwind. The hoses 37 and 38 are connected respectively to conduit 39 and 41 through a rotational coupling at the center of each reel as is well known in the art. The conduit 39 and 41 are connected to a conventional two-way slide valve generally designated 42. A sump 43 including a hydraulic pump (not shown) is provided to supply pressurized fluid to the hydraulic cylinder.

Figure 2:
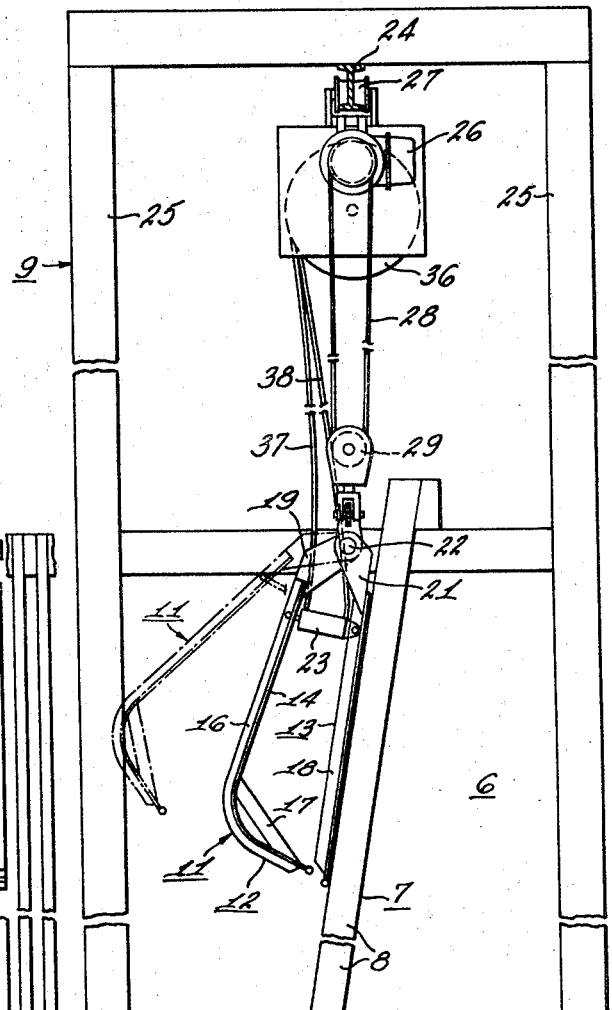
FIG. 2 is a side view of that trash rake.

In operation the valve 42 is moved in one direction to permit pressurized fluid to enter the conduit 41 and then through the hose 38 activating the hydraulic cylinder to open the rake 11 as is shown in phantom lines in FIG. 2. The electric hoist is then operated to lower the opened rake which slides on the screen 7 until it engages any trash which has collected thereon. After the trash has been engaged, the valve 42 is moved in the opposite direction to admit fluid through the hose 37 to retract the hydraulic cylinder piston rod closing the rake and collecting the trash between the tooth 12 and the tine 13. The electric hoist is then again activated to raise the rake above the water level to permit removal of the trash. As the rake is raised, the tension of the hoses 37 and 38 is removed, thereby permitting the spring-biased reels to rotate winding the hoses on the reels as the rake is raised.

From the above description it can be seen that a very simplified yet highly dependable trash rake is provided. The hydraulic cylinder provides positive power positioning of the rake tooth relative to the tines to ensure that the teeth maintain a tight grip on the trash.

The embodiments of the invention in which an exclusive property or privilege is claimed are defined as follows:

I claim:

1. A device for cleaning a screen interposed in a flowing stream of water to interrupt debris in the water comprising: a rake having a tooth and a tine connected at one end for pivotal movement relative to one another, said rake being disposed to permit sliding movement of said tine on said screen; a double-acting hydraulic cylinder connected between said rake and said tine and operable upon actuation to selectively move said tooth away from and into engagement with said tine; overhead hoisting means connected to said rake to raise and lower same along said screen; a source of pressurized hydraulic fluid; means operably connecting said pressurized fluid source in fluid communication with said hydraulic cylinder; and means for selectively directing said pressurized fluid to said cylinder to operate same.